United States Patent [19]

Tennikat

[11] Patent Number: 4,614,656

[45] Date of Patent: Sep. 30, 1986

[54] TWO PHASE MARGARINE

[75] Inventor: Josef Tennikat, Delmenhorst, Fed. Rep. of Germany

[73] Assignee: Lever Brothers Company, New York, N.Y.

[21] Appl. No.: 733,686

[22] Filed: May 14, 1985

[30] Foreign Application Priority Data

May 14, 1984 [GB] United Kingdom ............... 8412298

[51] Int. Cl.$^4$ .................. A23D 5/00; A23D 5/02; A23L 1/105
[52] U.S. Cl. ................................. 426/61; 426/89; 426/603; 426/653
[58] Field of Search .............. 426/89, 279, 282, 284, 426/602, 603, 61, 653

[56] References Cited

U.S. PATENT DOCUMENTS

| | | | |
|---|---|---|---|
| 2,575,874 | 11/1951 | Herlow | 426/603 X |
| 2,607,697 | 8/1952 | Brown . | |
| 2,668,114 | 2/1954 | Hensgen | 426/279 X |
| 2,787,550 | 2/1957 | Struble et al. | 426/603 X |
| 3,342,143 | 9/1967 | Bell . | |
| 3,917,859 | 11/1975 | Terada et al. | 426/602 |
| 3,939,290 | 2/1976 | Terada et al. | 426/564 |
| 4,546,003 | 10/1985 | Izzo et al. | 426/603 X |

FOREIGN PATENT DOCUMENTS

| | | | |
|---|---|---|---|
| 1056200 | 6/1979 | Canada . | |
| 0076549 | 4/1983 | European Pat. Off. | 426/602 |
| 2386235 | 12/1978 | France | 426/284 |
| 1170081 | 11/1969 | United Kingdom . | |

*Primary Examiner*—Robert Yoncoskie
*Attorney, Agent, or Firm*—Milton L. Honig; James J. Farrell

[57] ABSTRACT

Margarine and shortenings contain a discrete fatty phase in which additional cooking ingredients such as antioxidants, ascorbic acid and emulsifiers are confined to improve the stability and the cooking propensities of the product.

6 Claims, No Drawings

TWO PHASE MARGARINE

This invention relates to margarine and other plastic emulsion foods which are used as ingredients in recipes for the preparation of cooked or baked goods.

Although margarine and related plastic emulsion foods are consumed as such, usually as spreads on bread and cooked or baked foodstuffs, they are also used in substantial quantities both on an industrial and domestic scale, as ingredients in recipes for the preparation of baked or other cooked goods themselves. Different and sometimes conflicting requirements may then be met, particularly as to the nature of the fat, but also as to the amount of other ingredients used in the recipe, for which the margarine may serve as a handy carrier. Thus, a harder fat may be preferred and more or different emulsifiers than those normally used in preparation of a stable plastic margarine. Other ingredients may be desired in the recipe which could undergo deterioration if distributed in the margarine by contact with the aqueous phase in the margarine or affect adversely the stability of the margarine. Against this is the convenience of providing the baker with a single product within which many of the ingredients he needs for his recipes are all pre-dispersed in the proportions he needs.

The present invention proposes a plastic fat food such as margarine or shortening in which a fatty phase is incorporated in the form of a discrete section or portion, optionally substituted free from aqueous phase and containing additional ingredients for food processes in which the margarine is to be used.

The additional ingredients may for example, comprise enzymes particularly amylases which are valuable aids in bread making, but which are susceptible to deterioration in contact with the aqueous droplets in margarine. Other ingredients include emulsifiers which distributed in the margarine composition would promote destabilisation of the water-in-oil emulsion, leading for example, to inversion effects in which the water droplets agglomerate providing ample substrate for continued grown of micro-organisms capable of promoting spoilage of the product and also oily exudation, the product being unfit for sale. The fat itself, comprising the non-aqueous section or portion of the composition according to the invention may constitute an ingredient which is required in recipes for which the product is intended, but which dispersed as a homogeneous component of the product, could give undesirable physical attributes to the product, rendering it for example, unduly difficult to handle.

Further examples of ingredients which may be incorporated in the water-free fatty phase of the product according to the invention include ascorbic acid. Others are widely used in baking bread and other leavened baker's goods, for promoting such characteristics as improving freshness and inhibiting the onset of staling, ropiness in bread, augmenting the leavening effect of yeast or other raising additives, and stabilisers in general.

Other components for bread improvers which may be incorporated in the fatty phase of the product include cystein and other amino acids, so-called DATA esters (de-acetyl tartaric acid), lactic acid esters and acceptable emulsifiers for culinary purposes, for example, partial glycerides, of stearic and palmitic acid, polyoxyethylene ethers of polyhydric alcohols eg, sorbitan mono-stearate, fatty acid esters of polyhydric alcohols, propylene glycol partial esters of such acids, partial esters of polyhydroxy carboxylic acids such as lactic, citric and tartaric acids with partial glycerides. Aqueous dispersions of emulsifiers can be included which if added conventionally are taken down. Stabilisers which may also be present include anti-oxidants, for example, butylated hydroxy toluene and butylated hydroxy anisole. Salts may be present for example, phosphates and in particular, calcium salts of fatty acids which inhibit the development of ropiness in bread. Sugar esters may also be present, whether as emulsifiers or to promote nutritive characteristics. Sugar and other saccharides may also be incorporated in the fatty phase of the products according to the invention.

An important advantage of the invention is that the amount of additional ingredients which may be incorporated into the products of the invention to meet the requirements of a recipe is no longer circumscribed by their effects upon the characteristics of the product itself within which the fatty phase is incorporated, nor upon the extent to which the additives themselves may be affected by the presence of the water phase in plastic emulsion products such as margarine. Thus the invention introduces a substantially greater degree of flexibility in the amount and nature of the ingredients that may be incorporated in the products. The amounts used may therefore be determined solely in relation to the amounts required in the recipe, proportionate to the margarine/fat content of the product of the invention. The composition of the product itself can correspondingly be made more flexible and with greater regard for those of its physical attributes that affect its handling and treatment by the baker.

The preparation of the products according to the invention is very simple; the margarine, shortening, or other plastic fat product is prepared in accordance with conventional practice, from a fat composition appropriate for the purpose, and for emulsion products an aqueous phase including emulsifiers appropriate for the purpose. The liquid emulsion is then worked and chilled with the aid of scraped-surface heat exchanger means eg, "Votators" and after resting as appropriate, the product is extruded. Margarines for culinary purposes are usually of a harder consistency than table margarines which may be spread directly at refrigerated temperatures, because for example, bakers prefer the easier dispersion in flour-containing recipes of the harder margarines. Softer table-type margarines may however be used in the course of the invention and these may be pour-filled.

The fatty phase of the products according to the invention may be incorporated into the product as an additional layer or sandwich filling or in the form of discrete lumps dispersed at intervals in the margarine. Preferably however, it is provided in the form of a bar or rod running through the interior of the margarine component. The ingredients required in the non-aqueous phase are assembled and dispersed in the melted fat which is thereafter cooled before being extruded or moulded into the shape appropriate. It is then incorporated into the margarine block for example, by co-extrusion. Of course, the roles may be reversed with the fatty phase constituting an outer layer through which a bar or rod of the margarine or shortening extends.

The amount of the fatty phase of the products for the invention is preferably from 2 to 20% of the total volume of the product, more preferably 4 to 8%.

In addition to the usual amounts of fat present in margarine, the compositions of the invention may extend to other aqueous emulsion products including pastes containing substantial amounts of sugar and other baking ingredients. Such compositions are used by bakers in the preparation of bakers' creams and related products. The invention may also be applied to compositions in which the margarine component is replaced by a low-fat plastic emulsion containing substantially less fat than margarine, and indeed to compositions such as shortening in which no aqueous phase at all is present.

The same or different fats may be used in the fatty phase as in the remainder of the products of the invention.

EXAMPLE 1

A blend of refined fats were prepared as follows:-

| Fat | Weight % |
| --- | --- |
| Rape | 5 |
| Rape (28) | 30 |
| Soyabean (28) | 3 |
| Fish (37) | 52 |
| Palm | 10 |

The temperatures in brackets indicate the slip melting points to which these fats were hardened by hydrogenation using an active nickel catalyst on a kieselguhr support.

An aqueous phase was prepared containing 0.3% salt and 0.2% starch as indicator for legislative purposes, together with a little citric acid for pH control. It was added to the fat blend at 70° C. with sufficient flavouring and colouring matter customary in margarine, in an amount of four times its weight of fat. Margarine was prepared by chilling, working and resting the emulsion thus obtained in "Votator" A (scraped surface heat exchanger) and B (resting) units. It was finally extruded in a continuous block approximately 10 cm × 8.3 cm and cut off at intervals for packing.

A non-aqueous fat phase was prepared consisting of a dispersion of 3.92 parts soyabean oil hardened to 28° C., to which was also added 1.5 parts lactylated partial glycerides and 0.5 parts partial polyglycerol ester and 0.08 lecithin as emulsifiers. After chilling it was extruded as a rod 26 mm diameter, centrally into the margarine blocks.

EXAMPLE 2

The fat phase was again 6% of the total composition and comprised 2.38% of a mixture of 10% soybean oil, 18% palm oil and 72% fish oil hardened to 37° C. The additives dispersed in it were 3% DATA ester, 0.3% enzyme, 0.02% ascorbic acid and 0.3% calcium acetate. With these components, Example 1 was repeated.

EXAMPLE 3

A baker's cream was prepared using scraped surface heat exchanger means as described in Example 1. The cream was extruded in a block, as described for margarine and a non-aqueous fat composition was introduced in the form of a bar extending through the cream block, to provide a combined composition of 94% cream and 6% non-aqueous fat composition.

The fatty phase was as follows:-

|  | Weight % |
| --- | --- |
| Ascorbic Acid | 0.02 |
| Calcium Acetate | 0.3 |
| Enzyme | 0.23 |
| DATA Ester | 2.5 |
| Palm Oil | 2.95 |

The product from Example 1 was tested in the preparation of sand cake made according to conventional methods and gave excellent products with very good volume, crumb and texture.

The products from Examples 2 and 3 were tested as ingredients in the preparation of yeast leavened doughs according to the present invention and gave excellent products with very good volume, crumb and texture.

In a comparative experiment, a product was made up according to the invention, consisting of 94% of margarine phase and 6% of a fatty phase which was extruded as a rod, centrally through a block of the margarine.

The margarine was prepared conventionally and comprised 80.2% fat phase made up of 79.9% fat, 0.08% lecithin and 0.22% partial glycerides. The aqueous phase comprised 19.06% water, 0.5% salt, 0.2% starch, 0.03% citric acid and 0.01% flavouring and colouring agents.

The fatty phase comprised 1.5% lactic acid ester, 0.5% polyglycerol ester, 0.08% lecithin and 3.92% soybean oil hardened to a slip melting point of 28° C.

The product was stable and exhibited no exudation of oil. Its baking characteristics were compared with the margarine alone and also with a further margarine control of substantially the same composition with the addition of the same amount of the polyglycerol and lactic acid ester, but have integral ingredients in the margarine. This control exhibited severe oily exudation.

All three products were tested in a cake batter using equal parts with flour, sugar and egg, baked at 190° C. for 45 minutes.

The products of the invention produced a superior batter to the two controls, with markedly improved baking volume from a lower batter volume, and good crumb structure in a cake of good appearance and excellent taste.

In a further comparative experiment, a product according to the invention comprised 94% margarine and 6% fatty phase as before. The fatty phase comprised 3% DATA ester, 0.3% enzyme, 0.3% calcium acetate, 0.02% ascorbic acid and 2.38% palm oil. The fat component of the margarine comprised 79.9% fat, 0.22% partial glycerides and 0.08% lecithin and the water phase included only salt, starch, citric acid, flavouring and colouring.

The product was entirely acceptable, with no detected change in smell, taste and colour, after 3 months.

Margarine controls, as before, were made from the same ingredients, with and without the additional non-fat components of the fatty phase, as integral ingredients of the margarine stock. The margarine containing these ingredients was of poor storage stability and was unfit for sale after only two months.

All of the products were tested as ingredients in the following bread recipe, with parts by weight:
3000 parts flour
300 parts each margarine and sugar
45 parts salt
240 parts yeast 1500 parts water the resulting dough was stored and baked for 30 minutes at 200° C.

Bread baked from the dough containing the product of the invention exhibited good and tender crumb structure, both before and after storing the dough for three months, and was superior to both controls. The dough based on the control margarine containing the additional ingredients deteriorated on storage and bread baked from it reflected this.

Similar control tests were made in baking white bread for 30° C. at 200° C. using the following recipe:

1500 parts wheatflour
300 parts bakery cream
120 parts yeast
22 parts salt
800 parts water The bakery cream tested according to the invention comprised 35% sugar, 8% water, 4% free gelatinised flour balanced fat and emulsifiers. 6% other fatty phase was extruded into the cream and consisted of 2.38% palm oil, 2.5% DATA ester, 0.23% enzyme, 0.3% calcium acetate and 0.02% enzyme. No change was detected in colour, smell, taste or baking qualities even after 12 months storage of the product according to the invention.

In contrast, a similar bakery cream in which the additional ingredients of the fatty phase were incorporated as an integral part of the cream, deteriorated after only 6 weeks and produced a poor product unfit for sale.

I claim:

1. A baking composition wherein margarine is segregated from other baking ingredients in a composite product comprising margarine and a water-free fatty phase wherein the margarine comprises a continuous fat phase and an aqueous phase dispersed therein and the water-free fatty phase comprises a fat in which said baking ingredients are dispersed therein, and wherein the margarine and water-free fatty phase are combined in said composite body to provide a substantially uniform cross-sectional area in which the margarine constitutes a major proportion of the area and the water-free fatty phase constitutes the remaining minor proportion of said area which is distinct and separate from the margarine and the water-free fatty phase provides protection for the baking ingredient which may be adversely affected by water.

2. A baking composition according to claim 1 wherein the water-free fatty phase comprises from 4 to 8% of the total fat composition.

3. A baking composition according to claim 1 wherein the solids content of said continuous fat phase and said water-free fatty phase at 20° C. is not more than about 25%.

4. A baking composition according to claim 1 wherein the other baking ingredients are members selected from the group consisting of enzymes, emulsifiers, amino acids and mixtures thereof.

5. A baking composition according to claim 1 comprising a block of margarine surrounding a single rod or bar co-extensive with and inside said block of margarine.

6. A method of making a bakery composition comprising the steps of:
   (i) preparing a water-in-oil emulsion from a fat composition and an aqueous phase including emulsifiers;
   (ii) working and chilling the emulsion obtained in a scraped-surface heat exchanger means;
   (iii) preparing a water-free fatty phase by dispersion of emulsifiers and other baking ingredients into a plastic fat, said water-free fatty phase being present to provide protection for the baking ingredients which may be adversely affected by water; and
   (iv) extruding said fatty phase into the margarine in a proportion of about 4 to about 8%.

* * * * *